June 21, 1949.     J. A. DOREMUS     2,473,791
INDUCTION MOTOR SERVO SYSTEM

Filed Jan. 31, 1947     2 Sheets-Sheet 1

INVENTOR
JOHN A. DOREMUS
BY Elmer J. Gorn
ATTY.

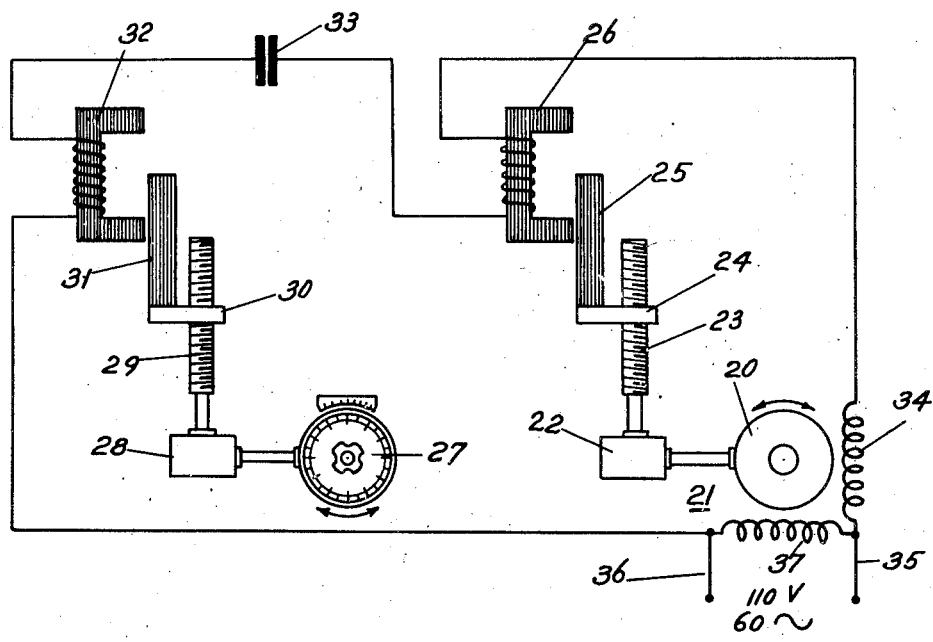
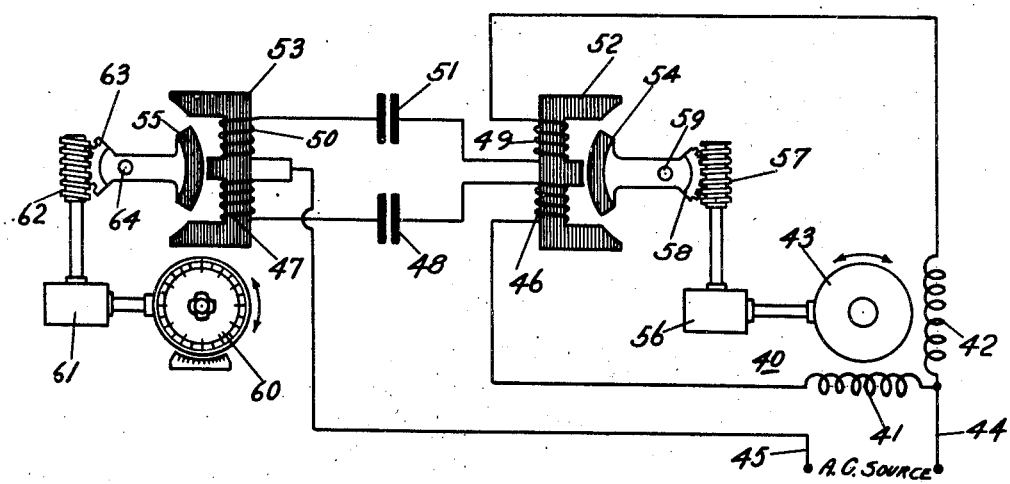

Patented June 21, 1949

2,473,791

UNITED STATES PATENT OFFICE 2,473,791

INDUCTION MOTOR SERVO SYSTEM

John A. Doremus, Chicago, Ill., assignor, by mesne assignments, to Raytheon Air Beam, Inc., Newton, Mass., a corporation of Delaware Application January 31, 1947, Serial No. 725,686

3 Claims. (Cl. 318—28)

This invention relates to an improved form of servo system of the type having an adjustable position first element and an adjustable position second element driven by an electric induction servomotor to a position indicative of the position of the first element.

It is an important object of this invention to provide an improved and simplified electrical network for controlling the energization of the induction servomotor in accordance with changes in position of the first element of such servo systems in a manner to provide a variable servomotor torque, that is, however, limited in magnitude regardless of extreme positions of the first element, so as to prevent excessive servomotor strain and control the maximum servomotor speed in order to minimize overshooting and hunting of the servomotor.

It is also an object of this invention to provide an improved form of servo system that is energized by a source of alternating current and that is insensitive to the frequency or frequency changes of such energizing source.

Figure 1:
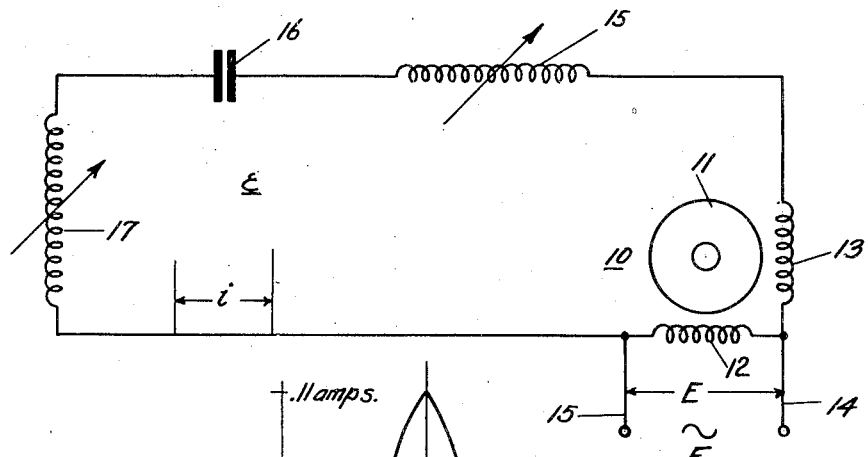
Figure 2A:
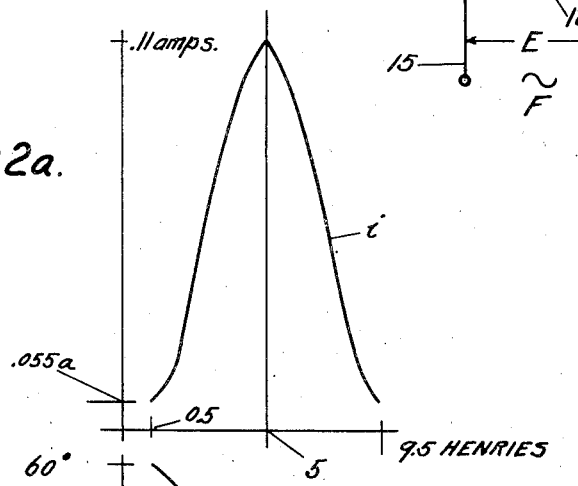
Figure 2B:
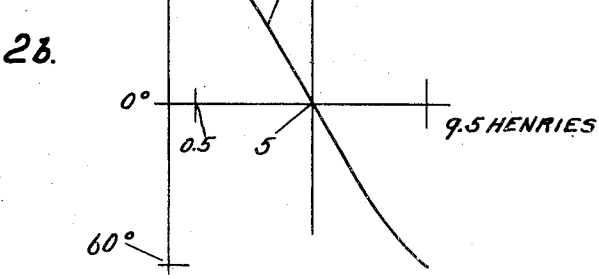
Figure 2C:
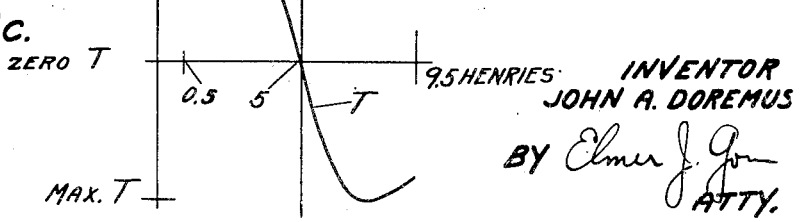

Further objects and advantages of this invention will be apparent from the following specification and drawings in which:

Fig. 1 is a simplified schematic of the basic electrical network employed in the servo system of this invention;

Figs. 2a, 2b, and 2c are typical response curves showing the network current, phase shift in degrees, and motor torque, respectively, for indicated variations of total inductance in the electrical network of Fig. 1;

Fig. 3 is a diagrammatic illustration of a complete servo system employing the basic network of Fig. 1; and Fig. 4 is a diagrammatic illustration of a modified form of servo system that is insensitive to frequency or frequency changes of the energizing current.

Referring to Fig. 1 of the drawings, a simplified schematic of the electrical phase shifting network 8 together with a split phase induction motor 10 is shown. The motor 10 is conventionally comprised of an induction rotor 11 of magnetic material and a pair of field windings 12 and 13 positioned at right angles to each other. The field winding 12 is connected across the terminals 14 and 15 of an alternating current source of known voltage E and frequency F, such as, for example, 110 volts at 60 cycles. Since the element 12 is shown merely diagrammatically, it is to be understood that its net impedance is such that the current through it is in phase with the applied voltage E. In order to energize the motor 10 and cause the rotor 11 to rotate, as is well known, a current having a different phase relative to the phase of the current in field winding 12 must be supplied to the field winding 13. The field winding 13 is therefore connected as a series part of the phase shifting network 8 across the alternating current terminals 14 and 15.

The phase shifting network 8 is shown to be comprised of a variable inductive reactance 15, a fixed capacitive reactance 16 and a variable inductive reactance 17 connected in series, and their reactive constants are selected to permit an adjustment of either of the variable reactances to produce a series resonant circuit for the frequency of the alternating current source. In other words, the series reactive circuit constituting the phase shifting network 8 is adjustable to provide zero phase shift or a variable degree of phase shift in either direction from the resonant point of zero phase shift for its circulating current, passing through the motor field winding 13.

The above will be better understood with reference to the curves of Figs. 2a, 2b and 2c. The base line for all three curves is indicative of a variation of total inductance comprised of variable inductors 15 and 17. Arbitrary values are shown and it is assumed that the applied voltage and frequency are fixed. It is obvious that the choice of reactive values, effective resistance, etc., in the circuit for a given size motor 10 to be energized from a selected alternating current source, will result in variations of the response curves due to changes in Q of the circuit and its sensitivity at the particular source frequency. The typical response curves 2a, 2b, and 2c are representative of those obtained with an applied voltage E of 110 volts at a frequency F of 60 cycles per second, and assuming an effective resistance of 1,000 ohms together with a fixed capacitance 16 of 1.4 microfarads. With a total inductance of five henries for the adjustable inductors 15 and 17, the network 8 will be resonant at 60 cycles or the source frequency and the current $i$, shown by curve 2a, will be maximum at approximately .11 ampere. Since the circuit is resonant and the inductive reactance is equal to the capacitive reactance, there will be zero phase shift P for the current flowing in the motor winding 13, as shown by Fig. 2b, and the motor torque T, as shown by Fig. 2c, will be zero. It may be stated here that the motor torque T is approximately equal to the current $i$ times the sine of the angle between the current and the voltage E. If the total network inductance is changed to 9.5 henries, the total reactance of the network 8 is predominantly inductive and a phase shift P of approximately minus 60 degrees will be obtained for a current $i$ of about .055 ampere resulting in a motor torque T near maximum to rotate the motor rotor 11 in one direction. On the other hand, if the total inductance is changed to 0.5 henry, the total reactance becomes predominantly capacitive and a phase shift P of approximately plus 60 degrees will be obtained for a current $i$ of .055 ampere resulting in a motor torque T' near maximum to rotate the motor rotor 11 in the opposite direction.

An important characteristic of this system is now apparent. As the phase angle or shift P is increased, the current $i$ is reduced, and since the motor torque T is approximately equal to the current $i$ times the sine of the angle P, it is obvious that the maximum motor torque is predetermined and obtained somewhat before a maximum variation of total inductive or capacitive reactance is obtained in the system. This characteristic should be borne in mind when considering the servo systems shown in Figs. 3 and 4 of the drawings since it is effective to prevent overload of the servomotor or excessive motor speed. It should also be noted that the variation of inductance of Fig. 2c at which the maximum torque T occurs is inversely proportional to the Q of the phase shifting circuit.

While, for purposes of this description, the phase shifting network 8 is shown to comprise variable inductive reactors in series with a fixed capacitive reactor, it should be understood that variable capacitive reactors or variations of combinations of the two types of reactances may be used where suitable in connection with a selected frequency F for the applied voltage E.

In order to use the basic electrical network of Fig. 1 in a servo system, as shown by Fig. 3 of the drawings, the rotor 20 of the servomotor 21 is connected through suitable gearing 22 to a threaded shaft 23. Engaged on the threaded shaft 23 is a split nut carrying a driven adjustable position member or armature 25 of magnetic material adapted to be moved within the field of an iron core choke 26 to thus vary the inductive reactance of the choke. A calibrated handwheel 27 is connected through suitable gearing 28 to the threaded shaft 29 carrying a split nut 30 and an adjustable position first member or movable magnetic armature 31 to cooperate with the iron core choke 26. The threaded shaft 29 is oppositely threaded to that of shaft 23 so that a similar rotation for both shafts 23 and 29 causes an opposite variation in the inductance of chokes 26 and 32.

The coils of the chokes 26 and 32 are connected in series with a capacitor 33 and one field winding 34 of the split phase motor 21 to the terminals 35 and 36 of the 110 volt, 60-cycle source. The other field winding 37 of the motor 21 is connected across the terminals 35 and 36.

Assuming the same circuit constants as described for Figs. 1, 2a, 2b, and 2c of the drawings, and with the total inductance divided between chokes 26 and 32, it will be apparent that the system will balance with the total inductance at a value to produce resonance and zero torque for the motor rotor 20. Upon changing the position of the first member in a selected direction, the inductance of choke 32 will change in the selected direction, making the system non-resonant and producing a phase shift for the current $i$ flowing through the motor field winding 34 to cause the rotor 20 to be rotated in the selected direction. Such motor rotation correspondingly adjusts the inductance of choke 26 to bring the total inductive reactance in the system back to a value to cause the system to be resonant and stopping the motor with the driven adjustable position member 25 at a selected position indicative of the adjusted position of the first member 31.

Instead of the variable choke 26, a variable capacitor (not shown) may be used for selected frequencies of the source, and under such circumstances the shaft 23 must be threaded in the same direction as the threaded shaft 29, since capacitive reactance is of the opposite sense to inductive reactance.

The servo system of Fig. 3 is sensitive to frequency changes of the applied alternating current. The system of Fig. 4 is somewhat modified to be insensitive to frequency changes of the source. The split phase motor 40 is provided with a pair of field windings 41 and 42 and a rotor 43. Each of the field windings 41 and 42 is connected in series with similar phase-shifting networks to the terminals 44 and 45 of the alternating current source. The field winding 41 is connected in series with the source and variable inductors 46, 47 together with fixed capacitor 48. Similarly the field winding 42 is connected in series with the source and variable inductors 49, 50 together with fixed capacitor 51. The inductors 46 and 49 may be wound on a common E-shaped magnetic core 52 while the inductors 47 and 50 may be wound on a similar magnetic core 53. Movable within the air gaps of the magnetic cores 52 and 53 are magnetic armatures 54 and 55 to thus vary the respective inductances of the inductors 46, 47, 49 and 50 depending upon the selected direction of movement for the armatures as should be apparent from the drawings.

The motor rotor 43 is connected through gear box 56 to worm gear 57 engaging a sector gear 58 at one end of the armature or what may be called the driven adjustable position member 54 pivoted at 59. Similarly, the calibrated handwheel 60 is connected through gear box 61 to worm gear 62 engaging the sector gear 63 at one end of the armature or what may be called the first adjustable position member 55 pivoted at 64. The worm gear 62 is oppositely threaded to worm gear 57 so that similar rotations of gears 57 and 62 will cause opposite variations of inductances for inductors 46 and 49 relative to inductors 47 and 50.

With the servo system thus described in connection with Fig. 4 of the drawings, the phase-shifting network for each motor field winding 41 and 42 is normally adjusted to the same amount of phase shift and preferably adjusted to resonance at the frequency of the alternating current source, so that there is no relative phase difference for the currents flowing in the motor field windings 41 and 42, and therefore the rotor 43 is not rotated. It is preferable to resonate both phase-shifting networks of Fig. 4 to the source frequency since it enables the advantageous responses of the system to occur much in the manner shown by the curves of Figs. 2a, 2b, and 2c. Upon changing the position of the first adjustable position member 55, the inductance of inductors 47 and 50 will be oppositely changed, thus shifting the phase of the current in winding 42 in one direction and the phase of current in winding 41 in the opposite direction, and resulting in a net relative phase difference between the currents in the two field windings 41 and 42. The rotor therefore rotates in a direction in accordance with the direction of movement of member 55 until the driven member or armature 54 has been moved to a position readjusting the inductances of inductors 46 and 49 to cause identical phase shifts of the currents flowing through field windings 41 and 42, and thus stopping the driven member 54 at a position proportional to the position of the first adjustable position member 55. Since the phase-shifting networks of this system shown by Fig. 4 of the drawings are not necessarily required to be resonated at the source frequency, it is apparent that, if the two phase-shifting networks are of the same Q, the system will be insensitive to frequency variations of the source voltage because there will be an identical change in phase shift for both networks due to changes in frequency of the source.

It should be understood that the servo system of this invention is not necessarily limited to the specific arrangement and components shown since substitute arrangements will be apparent to those skilled in the art without departing from the spirit and scope of the invention as defined in the appended claims.

What is claimed is:

1. A servo system comprising an adjustable position first element, a driven adjustable position second element, a split phase induction motor for driving said second element, a source of alternating current for energizing said motor, a first adjustable phase-shifting network connected in series with one winding of said motor and said source, and a second adjustable phase-shifting network connected in series with the other winding of said motor and said source, each of said first and second networks having two variable reactors connected in series with a reactor of opposite sense, one variable reactor of each network comprising a winding mounted on a core which is common to both networks, the inductances of said windings being oppositely varied in accordance with the position of said first element, the other variable reactor of each network being varied in accordance with the position of said second element to thereby adjust the phase shift of each network to be equal to each other after each change in position of said first element.

2. A servo system comprising an adjustable position first element, a driven adjustable position second element, a split phase induction motor for driving said second element, a source of alternating current for energizing said motor, a first adjustable phase-shifting network connected in series with one winding of said motor and said source, and a second adjustable phase-shifting network connected in series with the other winding of said motor and said source, each of said first and second networks having two variable reactors connected in series with a reactor of opposite sense and adapted to be resonated to the frequency of said source, one variable reactor of each network comprising a winding mounted on a core which is common to both networks, the inductances of said windings being oppositely varied in accordance with the position of said first element, the other variable reactor of each network being varied in accordance with the position of said second element to thereby adjust the phase shift of each network to be equal to each other after each change in position of said first element.

3. A servo system comprising a pair of magnetic cores, control and controlled armatures adjacent, respectively, said magnetic cores, a split phase induction motor adapted to be energized by a source of alternating current, said motor being coupled to said controlled armature to adjust its position with respect to its adjacent core, a first phase-shifting network connected in series with one winding of said motor and adapted to be connected across said source of alternating current, and a second phase-shifting network connected in series with the other winding of said motor and also adapted to be connected across said source of alternating current, each of said phase-shifting networks including a pair of windings wound, respectively, on said cores and connected in series with a capacitor, the inductances of the windings on one core being oppositely variable by adjustment of the position of said control armature, and the inductances of the windings on the other core being oppositely variable by adjustment of the position of said controlled armature to thereby adjust the phase shift of each network to be equal to each other after each change in adjustment of said control armature.

JOHN A. DOREMUS.

REFERENCES CITED

The following references are of record in the file of this patent:

UNITED STATES PATENTS

| Number | Name | Date |
| --- | --- | --- |
| 2,260,122 | Moore | Oct. 21, 1941 |
| 2,371,236 | Gille et al. | Mar. 13, 1945 |
| 2,390,463 | Roters | Dec. 4, 1945 |